(12) United States Patent  
Rekieta et al.

(10) Patent No.: US 9,188,832 B2
(45) Date of Patent: Nov. 17, 2015

(54) METHOD AND SYSTEM FOR GENERATING A DISPLAY

(71) Applicant: Texas Instruments Incorporated, Dallas, TX (US)

(72) Inventors: David W. Rekieta, Van Alstyne, TX (US); Getzel Gonzalez Garcia, Flower Mound, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/172,296

(22) Filed: Feb. 4, 2014

(65) Prior Publication Data

US 2014/0153082 A1    Jun. 5, 2014

Related U.S. Application Data

(62) Division of application No. 11/647,968, filed on Dec. 29, 2006, now Pat. No. 8,643,630.

(51) Int. Cl.
  *G09G 3/34* (2006.01)
  *G02F 1/31* (2006.01)
  *G09G 3/00* (2006.01)
  *H04N 9/31* (2006.01)

(52) U.S. Cl.
  CPC *G02F 1/31* (2013.01); *G09G 3/002* (2013.01); *G09G 3/3413* (2013.01); *H04N 9/3111* (2013.01); *H04N 9/3129* (2013.01); *H04N 9/3155* (2013.01); *H04N 9/3161* (2013.01); *G09G 3/346* (2013.01); *G09G 2310/0235* (2013.01); *G09G 2320/0242* (2013.01); *G09G 2320/041* (2013.01); *G09G 2320/064* (2013.01)

(58) Field of Classification Search
  USPC .................. 345/83, 38, 108–111, 204.69
  See application file for complete search history.

(56) References Cited

U.S. PATENT DOCUMENTS

| | | | |
|---|---|---|---|
| 5,829,856 A | 11/1998 | Perlo et al. | |
| 6,984,040 B2 * | 1/2006 | Childers | 353/30 |
| 7,352,339 B2 | 4/2008 | Morgan et al. | |
| 2003/0053003 A1 | 3/2003 | Nishi et al. | |
| 2005/0276471 A1 | 12/2005 | Shin et al. | |
| 2007/0139319 A1 * | 6/2007 | Nishida et al. | 345/83 |

* cited by examiner

*Primary Examiner* — Charles Hicks
*Assistant Examiner* — Jeffrey S Steinberg
(74) *Attorney, Agent, or Firm* — Jacqueline J. Garner; Frank D. Cimino

(57) ABSTRACT

A method of displaying an image includes alternating an active state of each of a plurality of light sources. The light sources each generate a light beam when active. The alternating includes deactivating an active light source before an output of a light beam from the active light sources falls below a first predetermined threshold. The alternating further includes activating a deactivated light source only after an output of the inactive light source reaches a second predetermined threshold. The method further includes receiving each of the light beams at a spatial light modulator.

19 Claims, 3 Drawing Sheets

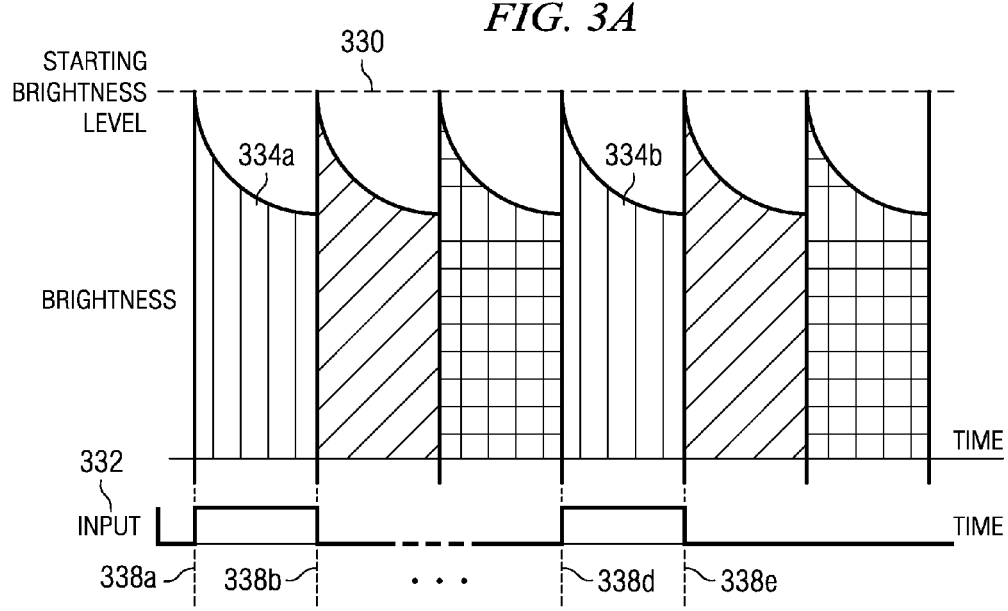
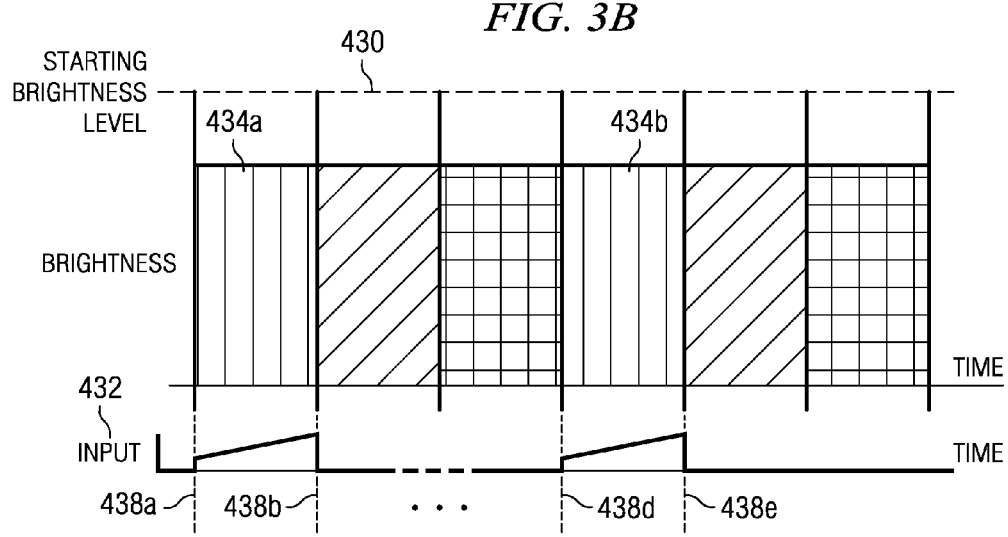

METHOD AND SYSTEM FOR GENERATING A DISPLAY

This application is a divisional of application Ser. No. 11/647,968, filed Dec. 29, 2006 (now U.S. Pat. No. 8,643,630), which is incorporated herein by reference.

BACKGROUND

This invention relates generally to the field of image displays and more specifically to a method and system for providing a more constant light source for a display.

Generating an image on a projection lens traditionally consists of utilizing white light generated by a lamp and passed through a color wheel to produce sequential colored beams of light corresponding to color filters in the color wheel, such as red, green, and blue. These sequential colored beams of light are combined by a DMD to produce a desired color and provided to the projection lens for later display. This standard process, however, has disadvantages. For example, it may reduce the quality of the image by creating a rainbow effect on the projection lens.

Other conventional processes for generating an image on a projection lens consist of using various light sources instead of a color wheel. These standard processes may reduce the rainbow effect. However, the quality of the image generated may also be reduced by the heat generated by the light sources. In particular, keeping a light source activated for too long causes the brightness of each light source to decrease. This, in turn, decreases the quality of the image generated.

SUMMARY

According to one embodiment of the present invention, a method of displaying an image includes alternating an active state of each of a plurality of light sources. The light sources each generate a light beam when active. The alternating includes deactivating an active light source before an output of a light beam from the active light sources falls below a first predetermined threshold. The alternating further includes activating an inactive light source only after an output of the inactive light source reaches a second predetermined threshold. The method further includes receiving each of the light beams at a modulator. The modulator includes an array of micro-mirror devices.

According to one embodiment of the present invention, a method of displaying an image includes alternating an active state of each of a plurality of lights sources. The output of the light beam generated by each light source is controlled by the amount of input provided to the light source. The method also includes causing the active light source to generate a light beam at a constant output while the light source is active by changing over a time interval the input to an active light source. The method further includes receiving each light beam at a modulator. The modulator includes an array of micro-mirror devices.

Certain embodiments of the invention may provide one or more technical advantages. A technical advantage of one embodiment may be that deactivating an active light source before the brightness of that light source falls below an unacceptable brightness threshold keeps the brightness of the light source within a range where the quality of the image is not diminished. Similarly, restricting the light source from being activated before the light source is capable of generating an acceptable starting brightness further allows the brightness to remain within a range where the quality of the image is not diminished. As a result, the quality of the image generated may increase.

A technical advantage of a further embodiment may be that increasing the amount of input received at a light source over time causes the brightness from the light source to remain constant throughout the time when light source is active. As a result of keeping the brightness of the light source constant, the quality of the image generated does not suffer from a reduction in quality.

Certain embodiments of the invention may include none, some, or all of the above technical advantages. One or more technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3A is a compilation of two graphs displaying the brightness over time generated by light sources in relation to the input to the light sources over time; and FIG. 3B is a compilation of two graphs displaying the brightness over time generated by light sources in relation to the input to the light sources over time.

DETAILED DESCRIPTION OF EXAMPLE EMBODIMENTS

Embodiments of the present invention and its advantages are best understood by referring to FIGS. 1A through 3B of the drawings, like numerals being used for like corresponding parts of the various drawings.

Figure 1A:
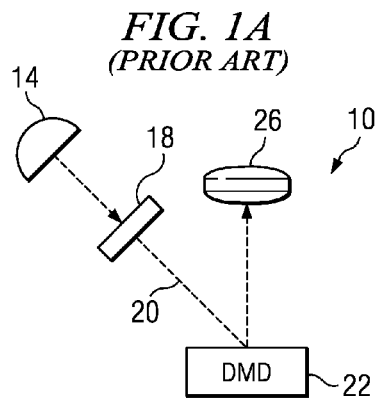
FIG. 1A is a block diagram of an example conventional image display system.

FIG. 1A is a block diagram of an example conventional image display system 10. According to the illustrated embodiment, conventional system 10 generally includes a lamp 14, a color wheel 18, a digital micro-mirror device (DMD) 22, and a projection lens 26. Conventional system 10 generates an image on projection lens 26 by utilizing white light generated by lamp 14 and passed through color wheel 18 to produce sequential colored beams of light 20 corresponding to color filters in color wheel 18, such as red, green, and blue. These sequential colored beams of light 20 are combined by DMD 22 to produce a desired color and provided to projection lens 26 for later display. DMD 22 is discussed further in reference to FIG. 1B.

Figure 1B:
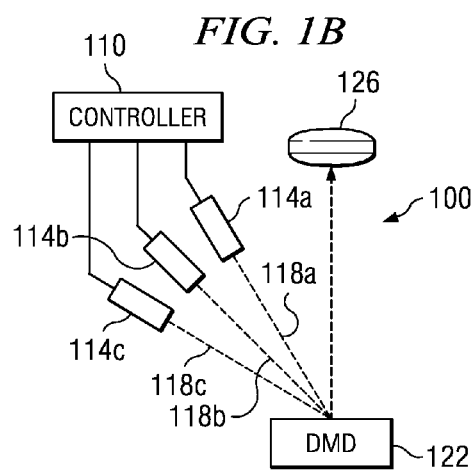
FIG. 1B is a block diagram of image display system according to the teachings of the invention.

FIG. 1B is a block diagram of image display system 100 according to the teachings of the invention. System 100 does not include a color wheel, but rather utilizes a plurality of different lights sources 114a-c. System 100 also includes a light source controller 110, a DMD 122, and a projection lens 126. As described in greater detail below, system 100 may allow light source controller 110 to activate and deactivate the plurality of light sources 114 so that a brightness from each light source 114 remains above a predetermined threshold.

Light source controller 110 refers to any device operable to activate and deactivate light sources 114. Light source controller 110 controls which light sources 114 are active at any given moment. In one embodiment, light source controller 110 activates only one light source 114 at a time. Therefore, while one light source 114 is active, the rest of the plurality of light sources 114 are inactive. In a further embodiment, light source controller 110 may refer to multiple light source controllers 110. For example, system 100 may include a light source controller 110 for each light source 114. Light source controller 110 is discussed further in reference to FIGS. 2A, 2B, and 2C.

Light sources 114 may refer to any light sources, such as, for example, Light Emitting Diodes (LEDs), lasers, or any other suitable source that provides a desired frequency or frequencies of light. In particular embodiments, each light source 114 may comprise a LED. Unlike broad-band light which must be filtered using a color wheel, as seen in conventional system 10, to separate the light into its red, green, and blue components, LEDs may be used to generate "field sequential" images of red, blue, and green components. In particular embodiments, light sources 114 may emit beams of narrow-band light of different colors. In another embodiment, light sources 114 may comprise lasers.

In the illustrated embodiment, light sources 114 include light source 114a, light source 114b, and light source 114c. In one embodiment, light source 114a may be selected to emit light beam 118a. Light beam 118a may include light selected within a desired wavelength range. For example, light source 114a may emit light beam 118a of a wavelength on the order of 400-475 nanometers. Thus, in this example, light source 114a may emit blue light. Light source 114b may be selected to generate light beam 118b in a wavelength range that is different from (or in certain circumstances, the same as) that of light wave 118a. For example, light beam 118b may include light selected within a desired wavelength range on the order of 485-570 nanometers. Thus, in this example, light source 114b may emit green light. Light source 114c may be selected to emit light beam 118c in a wavelength range that is different from (or in certain circumstances, the same as) that of light beam 118a and light beam 118b. For example, light beam 118c may include light selected within a desired wavelength range on the order of 610-690 nanometers. Thus, in this example, light source 114c may emit red light.

The number of light sources 114 and the selection of colors are merely examples. Any number of light sources 114 may be selected to emit appropriate beams of light of any desired wavelength range suitable for upgraded system 100. Thus, light sources 114 may be selectively designed to emit beams of primary colors, beams of secondary colors, or beams of white light. Light sources 114 may be chosen to selectively emit any appropriate color or range of colors. Accordingly, light sources 114 may include any suitable number of LEDs (or other suitable type) selected to generate any combination of colors. Additionally, each light source 114 may comprise multiple LEDs emitting either the same or different colors.

Digital micro-mirror device (DMD) 122 refers, in the illustrated example, to a micro electro-mechanical device comprising an array of hundreds of thousands of individually tilting micro-mirrors. In a flat state, each micro-mirror may be substantially parallel to projection lens 126. From the flat state, the micro-mirrors may be tilted, for example, to a positive or negative angle to alternate the micro-mirrors between an "on" and an "off" state. To permit the micro-mirrors to tilt, each micro-mirror attaches to one or more hinges mounted on support posts, and spaced by means of an air gap over underlying control circuitry. The control circuitry provides electrostatic forces, based at least in part on image data received at DMD 122. The electrostatic forces cause each micro-mirror to selectively tilt. Light beams 118 received on the micro-mirror array may be reflected by the "on" micro-mirrors to projection lens 126. Additionally, light beams 118 may be reflected by the "off" micro-mirrors towards a plurality of light dumps, not shown. The pattern of "on" versus "off" mirrors (e.g., light and dark mirrors) forms an image that is projected by projection lens 126. In various embodiments, DMD 122 is capable of generating various levels or shades for each color received.

In the illustrated embodiment, light source controller 110 is capable of controlling the brightness of light beams 118a-118c from light sources 114a-114c, respectively, so that the brightness of light beams 118a-118c remains above a threshold of unacceptable brightness. Traditionally, a thermal image display system includes one single light source shining light through a color wheel, as seen in FIG. 1A. However, the rotation of the color wheel from one color to the next may cause a rainbow effect on the projection screen that is visible to the human eye. Therefore, the image generated by the conventional image display system may be subject to improvement by eliminating the color wheel.

Certain embodiments of the present invention are capable of providing light in a manner that does not require a color wheel. For example, the single light source shining through a rotating color wheel is replaced with a plurality of light sources generating light beams of colors, which in some instances may be substantially similar to those produced by the color wheel. By using various light sources, any rainbow effect caused by the color wheel is no longer present in the image generated by the image display system due to the higher cycle rates now practicable in systems without a color wheel.

However, even without the color wheel, the quality of the image may still be reduced by the heat of the image display system. In particular, heat generated by the light source causes the brightness of each light source to decrease because the operating characteristics of certain light sources are affected by the temperature at which the light source operates. This, in turn, decreases the quality of the image generated by the image display system because the brightness of the light generated by the light source will vary based on the lights source's temperature, rather than being constant. Thus, the longer each light source is actively generating light beams, the lower the brightness from each light source becomes, in one embodiment, and the lower the quality of the image becomes as a result. This problem may be reduced by limiting the time that each light source is continuously on. This may be achieved by controlling the rate at which each light source is activated and deactivated.

According to example embodiments of the invention, each light source is both activated for only the amount of time when the brightness is acceptable, and then kept inactive, allowing the light source to cool, until the light source is capable of generating an acceptable starting brightness. Deactivating an active light source before the brightness of that light source falls below an unacceptable brightness threshold keeps the brightness of the light source within a range where the quality of the image is not diminished. Similarly, restricting the light source from being activated before the light source is capable of generating an acceptable starting brightness further allows the brightness to remain within a range where the quality of the image is not diminished. As a result, certain embodiments of the present invention may increase the quality of the image generated by an image display system.

Figure 2A:
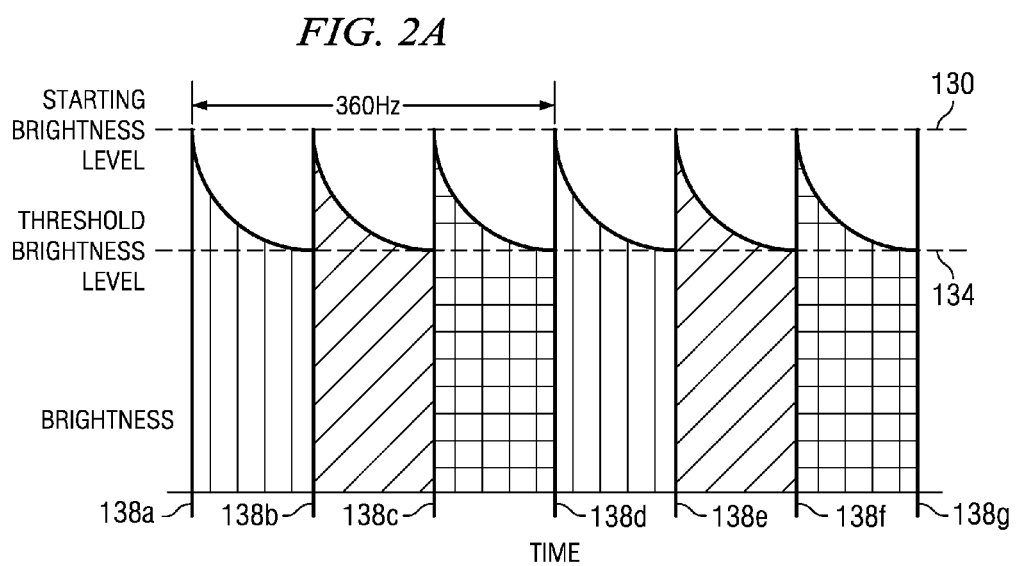
FIG. 2A is a bar graph describing the brightness level of light sources over time.

FIG. 2A is a bar graph describing the brightness level of light sources 114a-c over time. The vertical axis represents the brightness of the lights sources 114a-c and the horizontal axis represents time. A starting brightness level 130 and a threshold brightness level 134 are illustrated by the horizontal dashed lines. Transition points 138 are illustrated by the vertical lines. Transition points 138 refer to the time at which one light source 114 turns on and another light source 114 turns off. For example, the time between transition point 138a and transition point 138b may refer to the time at which a first light source 114 emits, in one embodiment, red light. Therefore, transition point 138b refers to the point in time at which the light source emitting red light turns off and the point in time at which a second light source, emitting blue light in one embodiment, turns on. As a result, blue light is emitted between transition point 138b and transition point 138c. Transition point 138c may refer to the point in time when the second light source 114, emitting blue light in one embodiment, is turned off and a third light source 114 is turned on to emit, in one embodiment, green light. Therefore, the combination of transition points 138a-d refers to one complete cycle of light sources 114a-c. Transition points 138d-g may refer to further transition times when the above cycle is repeated. In a further embodiment, the point in time at which one light source 114 is turned off and the point in time at which another light source 114 is turned on may not be identical. For example, two lights sources 114 may be turned on and remain active at the same time.

Starting brightness level 130 refers to the brightness level required before light source 114 is activated by light source controller 110. According to the illustrated embodiment, starting brightness level 130 is the same for each light source 114, but they could vary, if desired. Threshold brightness level 134 refers to the brightness level of light sources 114 at which it is desired to turn off the corresponding lights sources 114 to avoid the image generated by upgraded system 110 from beginning to diminish in quality. This may correspond to the level at which quality begins to diminish or may correspond to any suitable threshold level desired. Keeping the brightness for each light source 114 above threshold brightness level 134 causes the generated image to not diminish in quality.

In the illustrated embodiment, the brightness of each light source 114 is allowed to reach threshold brightness level 134 before the light source 114 is deactivated. Because the light source 114 remains active long enough to reach threshold brightness level 134, the image generated by upgraded system 110 may diminish in quality, depending on the selection of the threshold brightness level 134. Therefore, even though only one light source 114 is active at one given time, in this embodiment, and each light source 114 is kept inactive until it is cool enough to generate brightness at starting brightness level 130, the quality of the image still diminishes. In one embodiment, each respective brightness of light sources 114a-c diminishes to threshold brightness level 134 or below when one cycle of alternating the activation/deactivation of all light sources 114a-c is completed at 360 Hz or lower. Therefore, in the illustrated embodiment, each cycle (for example, transition point 138a through transition point 138d) occurs at a frequency of 360 Hz or lower. As a result, the successive activation of one light source (such as light source 114a) occurs at a frequency of 360 Hz or lower.

Figure 2B:
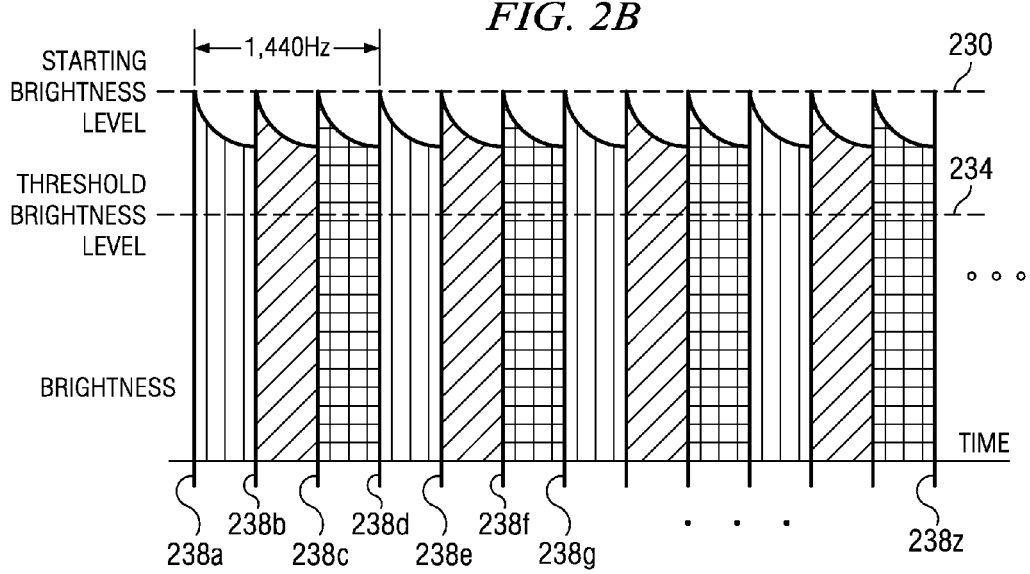
FIG. 2B is a bar graph describing the brightness of light sources over time when the active state of each light source is alternated at a rate above 360 Hz.

FIG. 2B is a bar graph describing the brightness of light sources 114a-c over time when the successive activation of each light source 114a-c occurs at a frequency greater than 360 Hz. FIG. 2B includes a brightness level 230, threshold brightness level 234, and transition points 238. Transition points 238 are substantially similar to transition points 138 of FIG. 2A. Likewise, threshold brightness level 234 is substantially similar to threshold brightness level 134 of FIG. 2A and starting brightness level 230 is substantially similar to starting brightness level 130 of FIG. 2A. In FIG. 2B, each light source 114 is activated when capable of generating starting brightness level 230 and deactivated before its brightness reaches threshold brightness level 234, causing the brightness to remain within a range where the image quality does not diminish. Therefore, the image generated does not suffer from a reduction in quality. In the illustrated embodiment, light source controller 110 both restricts each light source 114 from becoming active until the light source 114 is capable of producing starting brightness level 230, and also deactivates each light source 114 prior to its brightness reaching threshold brightness level 234. In the illustrated embodiment, one cycle of activation/deactivation of all light sources 114a-c is completed at 1440 Hz. Therefore, each cycle (for example, transition point 238a through 238d) occurs at a frequency of 1440 Hz. As a result, the successive activation of one lights source (such as light source 114a) occurs at a frequency of 1440 Hz.

Figure 2C:
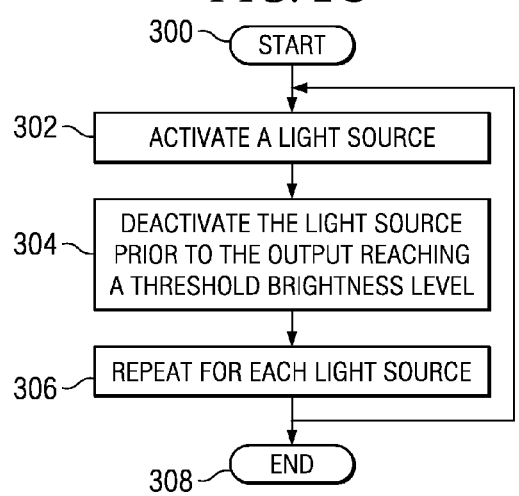
FIG. 2C is a flowchart describing a method for alternating the active state of each light source of a plurality of light sources.

FIG. 2C is a flowchart describing a method for alternating the active state of each light source of a plurality of light sources. The example acts may be performed by light source controller 110, as discussed above with reference to FIG. 1B, or by any other suitable device, such as multiple light source controllers 110. The method starts at step 300. At step 302, a light source is activated. In one embodiment, the active light source emits a light beam at a brightness substantially equal to the starting brightness level of each light source of the plurality of light sources. The heat generated by the active light source causes the brightness of the light source to diminish over time. At step 304, the light source is deactivated prior to the brightness of the light source reaching a threshold brightness level. In one embodiment, this allows the image generated by the image display system to not diminish in quality.

Once deactivated, the light source begins to cool down, allowing its potential brightness level to increase. In one embodiment, the light source is not activated again until it is cool enough to generate a brightness substantially equal to the starting brightness level. At step 306, the method returns to step 302 to activate the next light source of the plurality of light sources. In one embodiment, this causes the successive activation of each light source to occur at a frequency greater than 360 Hz. In one embodiment, the successive activation of each light source occurs at a frequency between 361 Hz and 1,440 Hz. In a further embodiment, the successive activation of each light source occurs at a frequency between 1,440 Hz and 2,880 Hz. The successive activation of each light source occurs, in a further embodiment, at a frequency, between 2,880 Hz and 5,760 Hz. In a further embodiment, the successive activation of each light source occurs at a frequency between 5,760 Hz and 12,000 Hz. Although the illustrated embodiment describes the alternation of light sources 114a-c, more or fewer light sources are contemplated. At step 308, the method ends as a result of the image display system being turned off.

In one embodiment, alternating the activation and deactivation of each light source causes only one light source of the plurality of light sources to be active at one time. In another embodiment, the activation of two or more light sources may overlap. In a further embodiment, alternating the lights sources at a rate which keeps the brightness above the threshold brightness level causes the lights sources to be active for a shorter period. As a result, less heat is generated. Therefore, the increased rate of alteration, in one embodiment, reduces the amount of heat transfer required in the image display system.

FIG. 3A is a compilation of two graphs displaying the brightness over time generated by light sources 114 in relation to the input to light sources 114 over time. According to the illustrated embodiment, light sources 114 are activated with a starting brightness level 330. Starting brightness level 330 is substantially similar to starting brightness level 230 of FIG. 2B and starting brightness level 130 of FIG. 1B. As discussed in FIGS. 2A and 2B, the brightness of each light source 114 diminishes over time as a result of the build up of heat in image display system. In one embodiment, the quality of an image generated by image display system is reduced by the diminishing brightness of each light source 114.

According to the illustrated embodiment, the brightness of light source 114 is determined by the amount of input 332 received at the light source 114. In the illustrated embodiment, input 332 is only shown for one light source 114. Therefore, input 332 between transition points 338a and 338b determines the brightness over time of one light source 114, shown by bar 334a. Input 332 between transition points 338d and 338e determines the brightness over time of the same light source 114 later on in time, shown by bar 334b. Input 332 comprises any suitable energy used by light sources 114 to generate light beams 118. For example, input 332 may refer to voltage or current. In the illustrated embodiment, when light source 114 is inactive, light source 114 does not receive any input 332. Alternatively, when light source 114 is active, light source 114 receives a constant amount of input 332. As illustrated, despite receiving a constant input 332, the brightness of light source 114 diminishes over time as a result of the build-up of heat. Thus, by keeping the input constant, the brightness of light source 114 does not remain constant. Instead, the brightness may diminish.

FIG. 3B, describing an alternative embodiment of the present invention, shows a compilation of two graphs displaying the brightness over time generated by light sources 114 in relation to the input to light sources 114 over time. FIG. 3B illustrates a starting brightness level 430 and input 432. Starting brightness level 430 is substantially similar to starting brightness level 330 of FIG. 3A. Likewise, input 432 is substantially similar to input 332 of FIG. 3A. Additionally, similar to FIG. 3A, the illustrated embodiment only shows input 432 for one light source 114. Therefore, input 432 between transition points 438a and 438b determines the brightness over time for one light source 114, as represented by bar 434a. Input 432 between transition points 438d and 438e determines the brightness of the same light source 114 later on it time, as represented by bar 434b.

In the illustrated embodiment, the brightness of light sources 114 is below starting brightness level 430; however, the brightness of the light sources 114 remains constant throughout the active state of the light source 114. This constant brightness is the result of a non-constant input 432. By increasing the amount of input 432 received at light source 114 over time, the brightness from light source 114 also increases over time. This increase in brightness counters the decrease in brightness, discussed above in FIG. 3A, caused by the build-up of heat. In the illustrated embodiment, the diminishing brightness caused by the build-up of heat and the increasing brightness caused by the increase of input 432 cancel each other out, causing the brightness of light source 114 to remain constant throughout the time when light source 114 is active. As a result of keeping the brightness of light source 114 constant, the quality of the image generated by image display system does not suffer from a reduction in quality.

Although the illustrated embodiment describes input 432 increasing at a constant rate, further embodiments of the present invention contemplate a variable rate. Additionally, although initially receiving a lower input 432 causes the brightness of light sources 114 to be below starting brightness level 430, the constant brightness from light sources 114, in one embodiment, nullifies any problems associated with starting the brightness below starting brightness level 430.

Although this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method of displaying an image, comprising:
    alternating an active state of each of a plurality of light sources, the light sources each generating a light beam when active, the alternating comprising:
        deactivating an active light source before an output of a light beam from the active light source falls below a first predetermined threshold; and
        activating an inactive light source only after an output of the inactive light source reaches a second predetermined threshold; and
    receiving each of the light beams at a modulator, the modulator comprising an array of micro-mirror devices.

2. The method of claim 1, wherein the light sources comprise light emitting diodes.

3. The method of claim 2, wherein the light sources comprise red, blue, and green light emitting diodes.

4. The method of claim 1, wherein alternating an active state of each of a plurality of light sources further comprises activating only one light source of the plurality of light sources at a time.

5. The method of claim 1, wherein alternating an active state of each of a plurality of light sources further comprises alternating an active state of each of a plurality of light sources such that successive active states of a respective light source occur at a frequency greater than 360 Hz.

6. The method of claim 1, wherein alternating an active state of each of a plurality of light sources further comprises alternating an active state of each of a plurality of light sources such that successive active states of a respective light source occur at a frequency in a range selected from the group consisting of between: 361 Hz and 1,440 Hz, 1,440 Hz and 2,880 Hz, 2,880 Hz and 5,760 Hz, and 5,760 Hz and 12,000 Hz.

7. A method of displaying an image, comprising:
    successively activating and deactivating respective ones of a plurality of light sources for illumination of a spatial light modulator during an image display time, each light source generating a respective different color light beam when activated, and the light beam of each light source having an output brightness that decreases with rising temperature as the light source heats up when activated, including:
        deactivating each activated light source before the decreasing output brightness of the associated light beam due to heating falls below a first predetermined brightness threshold; and reactivating each deactivated light source only when the light source has sufficiently cooled to enable the output brightness of the associated light beam to reach a second predetermined brightness threshold when that light source is reactivated.

8. The method of claim 7, wherein the light sources comprise light emitting diodes.

9. The method of claim 8, wherein the light sources comprise red, blue and green light emitting diodes.

10. The method of claim 9, further comprising modulating the respective light beams from the successively activated and deactivated light sources with the spatial light modulator, and projecting the modulated light beams to display the image.

11. The method of claim 10, wherein the spatial light modulator comprises a micro-mirror device.

12. The method of claim 11, wherein only one light source of the plurality of light sources is activated at a time.

13. The method of claim 12, wherein the light sources are activated such that successive active states of a respective light source occur at a frequency greater than 360 Hz.

14. The method of claim 13, wherein the frequency is in a range selected from the group consisting of between: 361 Hz and 1,440 Hz, 1,440 Hz and 2,880 Hz, 2,880 Hz and 5,760 Hz, and 5,760 Hz and 12,000 Hz.

15. The method of claim 7, further comprising modulating the respective light beams from the successively activated and deactivated light sources with the spatial light modulator, and projecting the modulated light beams to display the image.

16. The method of claim 7, wherein the spatial light modulator comprises a micro-mirror device.

17. The method of claim 7, wherein only one light source of the plurality of light sources is activated at a time.

18. The method of claim 7, wherein the light sources are activated such that successive active states of a respective light source occur at a frequency greater than 360 Hz.

19. The method of claim 18, wherein the frequency is in a range selected from the group consisting of between: 361 Hz and 1,440 Hz, 1,440 Hz and 2,880 Hz, 2,880 Hz and 5,760 Hz, and 5,760 Hz and 12,000 Hz.

* * * * *